Figure 1:
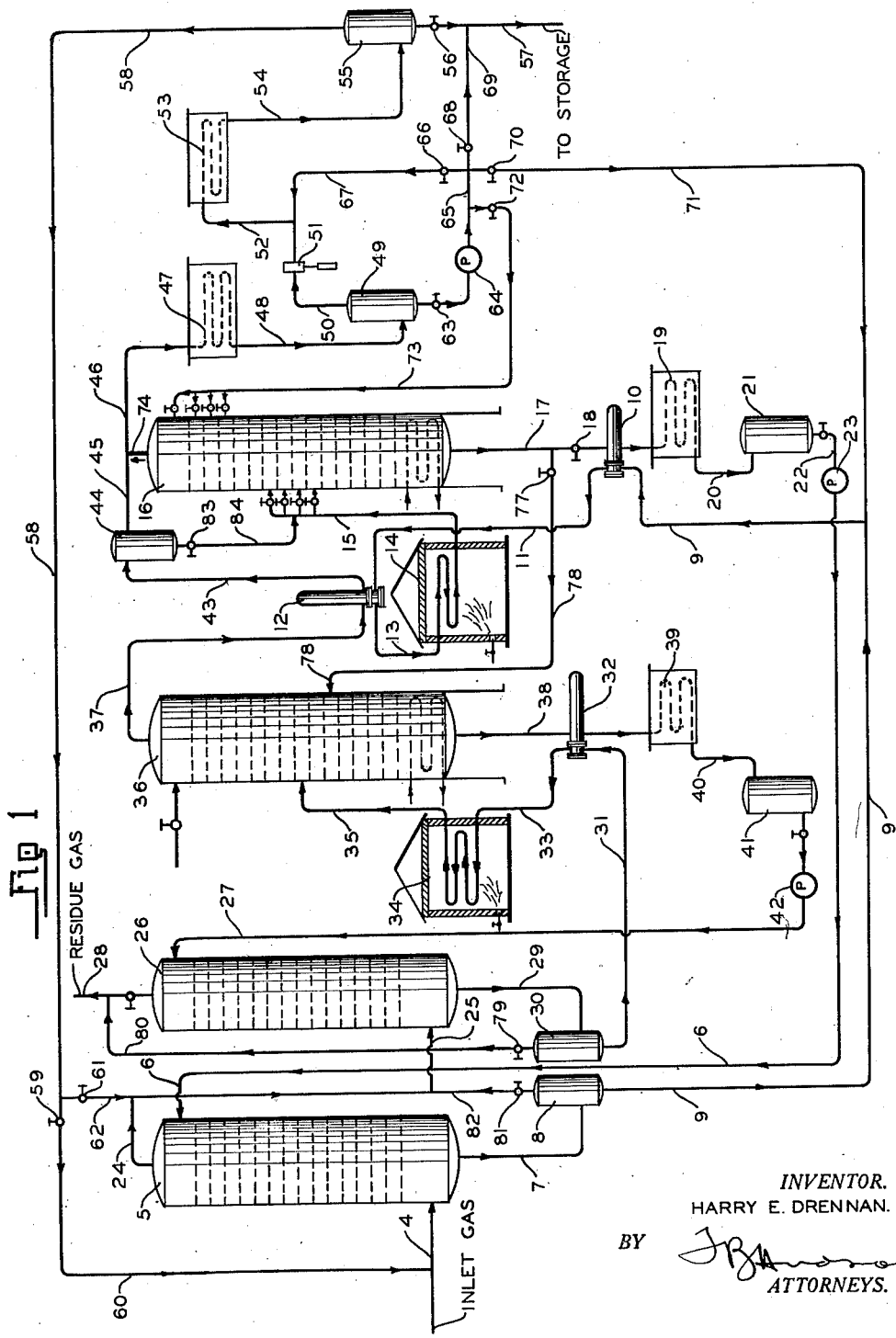

May 17, 1938. H. E. DRENNAN 2,117,548
PROCESS OF EXTRACTING AND RECOVERING VOLATILE
HYDROCARBONS FROM HYDROCARBON GASES
Filed Sept. 14, 1934 3 Sheets-Sheet 1

INVENTOR.
HARRY E. DRENNAN.
BY
ATTORNEYS.

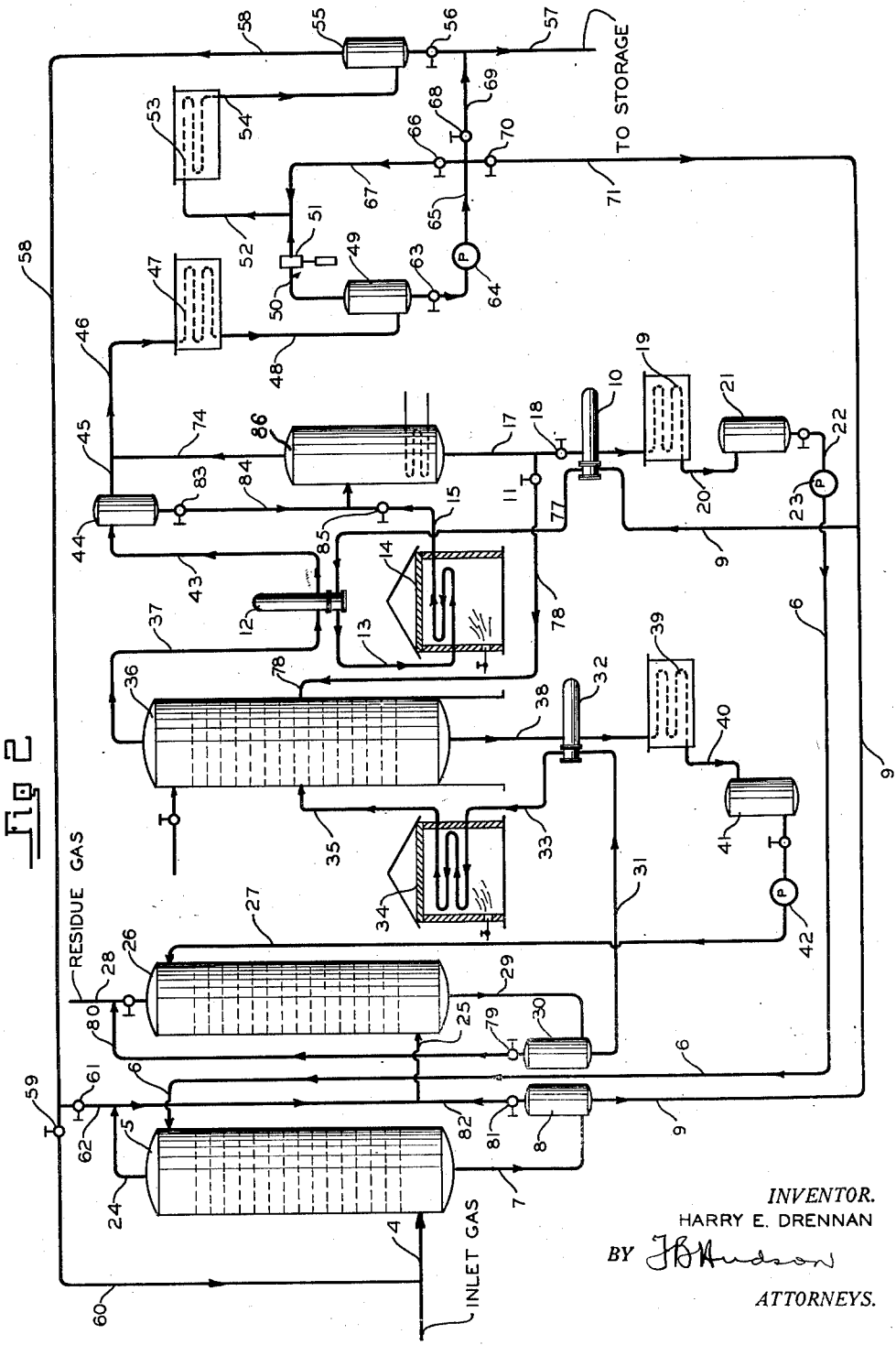

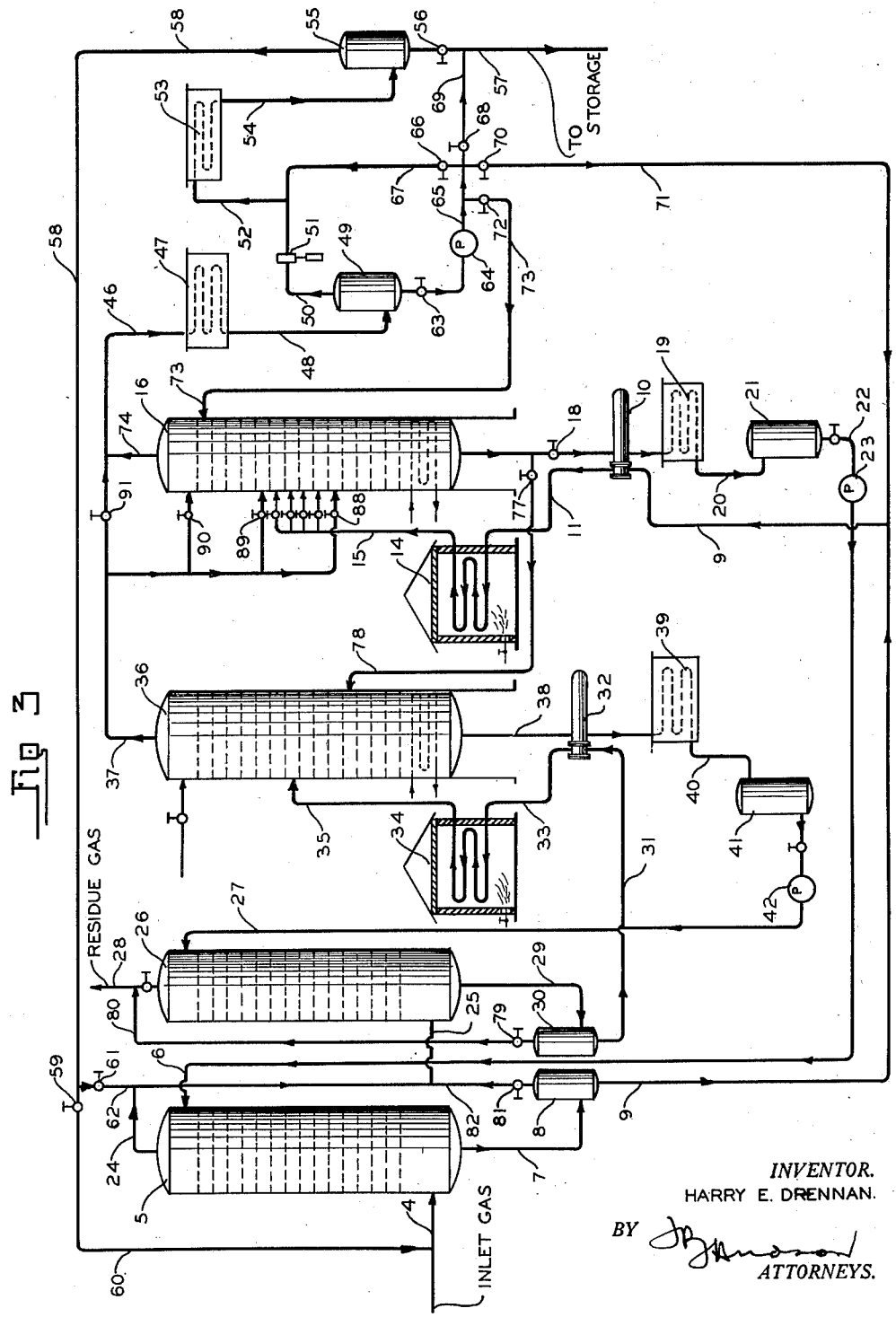

Patented May 17, 1938

2,117,548

UNITED STATES PATENT OFFICE 2,117,548

PROCESS OF EXTRACTING AND RECOVERING VOLATILE HYDROCARBONS FROM HYDROCARBON GASES

Harry E. Drennan, Bartlesville, Okla., assignor to Phillips Petroleum Company, a corporation of Delaware Application September 14, 1934, Serial No. 744,081

6 Claims. (Cl. 196—8)

This invention relates to a method for the extraction and recovery of volatile hydrocarbons from hydrocarbon gases or vapors, and it is an object of the invention to provide a method of commercial value and particularly suited for the recovery of volatile hydrocarbons.

This invention provides primarily, a method for the extraction and recovery of volatile liquids such as gasoline, butane, propane and ethane, from gases and/or vapors such as natural gas, still gases, etc.

Natural gases such as are available for the production of liquid hydrocarbons, or natural gasoline, usually contain large quantities of light or volatile hydrocarbons such as butane and propane. Until recent years these constituents have been practically worthless and were a hindrance in the manufacture of natural gasoline. Recently a relatively small proportion of these volatile hydrocarbons has been recovered and sold as liquefied gas. This was commercially possible since butane and propane were by-products in the manufacture of natural gasoline from natural gas. Now that it has been definitely demonstrated that butane and propane can be converted into a valuable high anti-knock gasoline, there is a need for some inexpensive method of producing large quantities of these volatile hydrocarbons.

The two methods generally used in producing natural gasoline from natural gas are: 1. The compression method, and 2. The absorption method.

The compression method usually comprises two stages. In the first stage the gas is compressed to about forty or fifty pound gauge, cooled and any condensate formed is collected. The remaining vapors are then compressed to about two hundred fifty pound gauge, cooled and condensate collected. The residue gas may be used for fuel. This method is practical only for processing very rich gases.

The absorption method which consists generally in bringing the gas or petroleum vapors into intimate contact with a liquid absorbent, generally a distillate or gas oil, at as low a temperature as is economically possible, and at a pressure ranging from a few to several hundred pounds, has practically displaced the compression method because the recovery is very high, in fact practically one hundred per cent. Also any gas rich or lean may be treated in an absorption plant, while only a rich gas is suitable for a compression plant.

The three most important factors effecting absorption are pressure, temperature and oil rate, or oil to gas ratio. The absorbers are generally operated at some pressure below one hundred pounds, usually about fifty pounds. The absorption temperature is usually about atmospheric. The oil rate is the factor which is easiest to vary, and the one which is usually varied to obtain a desired result. If an analysis of the residue gas shows that it contains an appreciable quantity of gasoline the oil rate is increased to extract same. The pressure might have been increased or the temperature lowered to obtain the same result.

In the extraction of gasoline from natural gas, butane and propane are also extracted. On a basis of percentage extracted, there will be more pentane than butane, and more butane than propane; for all practical purposes the percentage extracted will be inversely as their vapor pressures. The percentage of these constituents extracted can be increased as stated above by increasing the absorption pressure, lowering the absorption temperature or increasing the oil rate.

The oil rate is usually expressed in gallons of oil contacted with a thousand cubic feet of inlet gas. In making calculations involving oil to gas ratios, the oil and gas are expressed in mols, and one mol. of light oil will absorb as much butane as one mol. of heavy oil. But a quantity of light or low molecular weight oil will contain more mols than an equal volume of heavy or high molecular weight oil. That is an important consideration in selecting an absorbent medium. By selecting the lightest practical oil, less gallons will have to be circulated, or with an equal quantity circulated more gasoline and/or lighter hydrocarbons can be extracted. However, if too light an absorbent oil is used relatively large quantities of it will be carried out of the absorber with the residue gas as a vapor and mist.

The absorption pressure will be the determining factor in selecting a light absorbent. Light gas oil having a molecular weight between one hundred seventy and two hundred fifty is practical for absorption pressures above twenty pounds gauge. Gasoline could be used as the absorbent oil in the extraction of butane and lighter hydrocarbons without losing much of the oil overhead with the residue gas if the absorber pressure were three hundred pounds or more and preferably above four hundred pounds. By going to still higher pressures, eight hundred pounds and higher, butane could be used as the absorbing menstruum for propane, ethane, etc. Such high pressures are prohibitive in the extraction of butane and propane.

Appreciable quantities of butane and propane are now being extracted in the process of extracting natural gasoline from gases, but their production cannot be materially increased by increasing the absorption pressure, lowering the absorption temperature, or increasing the oil rate without excessive cost which is prohibitive at the present price of gasoline.

The object of this invention is to provide a process for extracting and recovering volatile hydrocarbons such as butane, propane and the like from hydrocarbon gases and vapors.

Another object of this invention is to provide a process for extracting and recovering volatile hydrocarbons such as butane, propane and the like from hydrocarbon gases and vapors by passing hydrocarbon gases and vapors through a plurality of absorbent menstruums.

Still another object of this invention is to provide a process for extracting and recovering volatile hydrocarbons such as butane, propane and the like from hydrocarbon gases and vapors by passing hydrocarbon gases and vapors through a plurality of absorbent menstruums having different characteristics.

A still further object of this invention is to provide a process for extracting and recovering volatile hydrocarbons such as butane, propane and the like from hydrocarbon gases and vapors by passing hydrocarbon gases and vapors successively through a plurality of absorbent menstruums increasing in molecular weight in the order in which the hydrocarbon gases and vapors pass therethrough.

This invention can be used in processing either lean or rich hydrocarbon gases for the purpose of extracting liquefiable hydrocarbons therefrom. In determining the volatility or molecular weight of the first absorbent, assuming two or more are used in a series of absorbing zones, the kind of gas to be processed, whether lean or rich, should be considered. The following might be considered a lean gas:

| Component: | Volume percent |
|---|---|
| Methane | 86.3 |
| Ethane | 8.1 |
| Propane | 3.4 |
| Butanes | 1.4 |
| Pentanes and heavier | 0.8 |
| | 100.0 |

For example, suppose it is desired to extract the propane and heavier components from a gas having the above composition, how volatile should the light absorbent be in the first absorber? (Since the temperature and pressure in the first absorbing zones will be a determining factor, assume a temperature of 100° F. and a pressure of 45 pounds gauge.) The said gas has only 0.8% of pentane and heavier, and most of this is pentanes. Under the above conditions a pentane free absorbent would be more suitable, such as a pentane free natural gasoline. Absorbents like hexane, heptane, and octane would be desirable also. In the above example if it is desired to extract 80% of the butane it would be necessary to circulate 20 gallons of the light absorbent in the first absorber, and 12 gallons of a heavy absorbent of the nature of gas oil, having a molecular weight of 215 in the second absorber, the absorbers having 8 trays. In order to get the same percentage of extraction of butane and propane using the above heavy absorbent alone, 65 gallons would have to be circulated.

The following may be considered a rich natural gas:

| Component: | Volume percent |
|---|---|
| Methane | 45.2 |
| Ethane | 23.0 |
| Propane | 16.9 |
| Butanes | 7.7 |
| Pentanes and heavier | 7.2 |
| | 100.0 |

Under the above conditions of temperature and pressure a butane free natural gasoline could be used in the first absorber without losing appreciable quantities of pentane overhead to the second absorber.

This invention contemplates using a heavy absorbent in the last absorbing zones to prevent loss of light absorbent in the residue gas, but does not wish to be limited to the use of liquid absorbents in the last zones. Solid adsorbents such as charcoal can be used in the place of the heavy liquid absorbent.

In general, the volatility of the absorbent that should be used in the first absorber depends upon the absorption temperature and pressure, and the composition of the gas being treated.

The various objects and features of my invention will be best and more fully understood from the following detailed description of a typical form and application of the invention applied to the recovery of gasoline, butanes, propane, etc. from natural gas or petroleum vapors, throughout which description I will refer to the accompanying drawings disclosing one form of apparatus in which my new process may be carried out.

In the accompanying drawings, Figure 1 illustrates diagrammatically one form of apparatus for carrying out the invention. Figure 2 is the same as Figure 1 with a modification of the method of recovering the absorbed constituents from the light absorbent. Here a flash tank is used instead of a fractionating still. Figure 3 illustrates still another method of recovering the absorbed constituents from the light absorbent.

Referring to the drawings in Figure 1, natural gas containing gasoline, butanes, propane, etc. flows through pipe 4 into absorber 5 near the bottom, flows up through the absorber where it is contacted on the bubble plates with a light absorbent medium such as natural gasoline or the heavy ends of natural gasoline which enters the absorber near the top through pipe 6 and flows down through the absorber countercurrent to the gas flow. Assuming good contact, the absorbent medium will absorb hydrocarbon constituents from the gas and at the bottom of the absorber it will be practically in equilibrium with the entering gas. The gas leaving the absorber will have been stripped of certain hydrocarbon constituents until it is practically in equilibrium with the entering oil on the top tray. The enriched absorption medium leaves absorber 5 through pipe 7 and flows into vent tank 8. Tank 8 may be at about the same pressure as absorber 5 or slightly lower. Some very light vapors may separate from the enriched oil. The enriched oil flows from tank 8 through pipe 9 to and through heat exchanger 10 where it is heated by the hot oil from still 16; out of heat exchanger 10 it flows through pipe 11 into heat exchanger 12, where it receives heat from the vapors overhead from still 36. From heat exchanger 12 the light rich oil flows through line 13 to and through a heater 14 where it is heated to the desired temperature. The heated oil flows from the heater 14 through line 15 into still or fractionating tower 16 at some intermediate point or points as shown. Still 16 may be operated at any desired pressure, but it is usually desirable to denude enriched absorbents at a pressure lower than that maintained in the absorption zone. Such stills are usually operated between about atmospheric and 20 pounds gauge pressure. The unvaporized hot enriched oil entering the still flows down into the stripping section where the absorbed constituents and the light ends of the absorbent are vaporized and flow countercurrent to the descending oil, to the upper part of the still which functions as a fractionating tower. The light ends of the absorbent are condensed and flow back to the bottom of the tower, the desired product is then taken overhead through line 74. The denuded light absorbent passes from the bottom of still 16 through line 17 and valve 18 into heat exchanger 10, giving up heat to the enriched light absorbent. From heat exchanger 10 the denuded oil flows through cooling coils 19, then through pipe 20 into accumulator tank 21. Pump 23 takes suction from tank 21 through line 22 and discharges the cool denuded light absorbent through line 6 into the top of absorber 5 and the process of absorption and subsequent distillation is continually repeated.

The gas leaving absorber 5 flows through pipes 24 and 25 into the bottom of absorber 26. The vapors from vent tank 8 flow through valve 81 and pipes 82 and 25 into absorber 26 also. Absorbent medium such as gas oil flows through pipe 27 into the top of absorber 26. The gas and absorption oil are contacted on the trays of the absorber in countercurrent flow. The heavy or high molecular weight absorbent medium absorbs all constituents which have a lower molecular weight than itself. In addition to extracting butanes and lighter, it will also extract any gasoline held in the gas, whether picked up in the first absorber or a part of the original gas. This is a safeguard against any loss of absorbent in the first absorber. The denuded gas from absorber 26 passes out of the system through valved pipe 28. The enriched oil containing gasoline and lighter constituents passes from absorber 26 through line 29 to vent tank 30, where a small quantity of light gases may be vented off through valve 79 and pipe 80 into pipe 28. The enriched oil flows from tank 30 through pipe 31 to heat exchanger 32 where it receives heat from the hot oil leaving still 36. From heat exchanger 32 it flows through pipe 33 to a heater 34, then through pipe 35 into still 36. In still 36 the gasoline and lighter constituents are separated from the absorption oil by fractional distillation. The hot denuded oil flows from still 36 through pipe 38 and heat exchanger 32 to cooling coils 39, thence through pipe 40 to accumulator tank 41, and from tank 41 the cool denuded heavy absorption oil is recirculated through pipe 27 to absorber 26 by means of pump 42.

The gasoline and lighter vapors separated from the absorption oil flow from still 36, pass through pipe 37 into and through heat exchanger 12 (losing heat to the enriched light absorbent from absorber 5) flow from the heat exchanger 12 through pipe 43 to accumulator tank 44. From tank 44 the excess condensate and vapors flow into pipe 45 and here the vapors from still 16 flow through pipe 74 into pipe 45 and the mixture of vapors and excess condensate flow through pipe 46 into condenser 47, then through pipe 48 into accumulator tank 49. The vapors from tank 49 flow through pipe 50 to compressor 51 where they are compressed to a high pressure. From the compressor the vapors flow through pipe 52 to condenser 53, and thence through pipe 54 to accumulator tank 55. The vapors from tank 55 are recirculated through pipe 58 to either absorber (5 or 26). The condensate from tank 55, which may be a mixture of gasoline, butanes, propane, etc., flows through valve 56 and pipe 57 to storage, or to a fractionating system, where the various hydrocarbon constituents are separated and liquefied.

It has been found more economical where possible, to pump the product (gasoline and butanes and lighter) from several plants such as the one described, to a central fractionating plant, where the product may be separated into gasoline, butane and propane, or any combination. If a central fractionating plant is not available the product may be fractionated where it is produced.

In processing a very lean gas, that is one lean in gasoline, some of the light absorbent used in absorber 5 may be vaporized or entrained with the gas and carried into absorber 26. In that case it will be necessary to add at intervals or continuously more absorbent to the light absorbent system. This may be accomplished in various ways. The condensate from tank 44 may be used as "make up" for the light absorbent lost in absorber 5 and also that carried out by the vapors from still 16. Regulated amounts of the condensate from tank 44 may be taken at intervals or preferably continuously through valve 83 and pipe 84 into pipe 15 and thence into still 16. The light ends of this condensate are flashed off in still 16, and the heavy ends become a part of the light absorbent.

The condensate in tank 49 is picked up by pump 64 through valved line 63 and discharged into line 65. A regulated amount passes through valve 72 and line 73 into still 16 at a point or points near the top of said still for reflux. If there is not sufficient condensate in tank 44 to supply the "make up" for the light absorbent, condensate may be taken from line 65 through valve 70 and passed through line 71 into the light oil system in line 9; the condensate taken into the system will pass through the denuding still 16 and the heavy ends of the said condensate will become a part of the light absorbent. The remainder of the condensate in line 65 may be passed through valve 66 and line 67 into line 52 where it mixes with the vapors as they enter the condenser coils 53. The condensate, since it contains higher boiling constituents than the said vapors, will have an absorption effect on the light vapors and cause more of them to be condensed or liquefied than would be otherwise. An alternative method would be to pass the condensate through valve 68 and line 69 into line 57 if it were desired to merely blend the two condensates before passing some to storage or to be fractionated.

The light absorbent may gradually get heavier due to the accumulation of the heavy ends from the gas or vapors, and entrained crude oil. When this happens a portion of the light absorbent oil may be transferred to the heavy absorbent oil system and replaced with lighter oil, to keep the light oil as light as desired, as described above. This may be done by passing the hot denuded light oil from line 17 through valve 77 and line 78 into still 36 at a point about the center of the tower. The gasoline and lighter ends are vaporized and pass overhead, while the heavier ends become a part of the heavy absorption oil.

An alternative method of distilling the light enriched oil is shown in the drawings Figure 2. The process is the same as shown in Figure 1 up to where the light or low molecular weight oil enters pipe 15. Now referring to the drawings, Figure 2, the light absorbent in pipe 15 flows through expansion valve 85 into flash tank 86 together with condensate from line 84 (coming from tank 44). In tank 86 the absorbed constituents are vaporized and pass out through line 74 into line 45, where they commingle with other vapors in passing through line 46 to condenser 53, etc. The unvaporized light oil passes from tank 86 through line 17 and valve 18 through heat exchanger 10, cooling coils 19 into tank 21, where it is recirculated to absorber 5 and the process is repeated.

Another alternative method of denuding the light absorbent is shown in Figure 3. The process is the same as that shown in Figure 1, up to where the heated light enriched absorbent leaves pipe 15. Passing through pipe 15 the enriched light oil is expanded into still 16 at an intermediate point or points about the center of the tower. At the same time hot gasoline vapors from still 36 pass through line 37 and may enter still 16 by passing through valved lines 88, 89 or 90, depending upon the operation and the molecular weight of the light absorbent. If a relatively heavy absorbent is being denuded in still 16 the vapors may enter still 16 through valved line 88, and if a relatively light absorbent is being denuded therein, the hot vapors may enter still 16 through valve line 90, or they may by-pass still 16 and pass through valved line 91. If the vapors from still 36 are passed into still 16 through valved line 88, below the point where the enriched absorbent enters, that is in the stripping section of the still, certain advantages in stripping are derived. If the said vapors enter still 16 through either valved lines 88, 89 or 90, by controlling the temperature at the top of the still, the quantity of light oil in the system may be maintained constant by condensing the heavy ends of the vapors entering valved lines 88, 89, and 90 by means of reflux. The average molecular weight of the light oil may be kept constant as described above by passing a portion of it from the bottom of still 16 through line 17, valve 77 and line 78 into still 36. There are certain operations where it is desirable to by-pass a portion of the vapors from still 36 through valved line 91 and pass a portion into still 16 at some intermediate point. The hook-up in Figure 3 is flexible enough for ordinary operation. In still 16 the mixture of vapors is fractionated to separate the light absorbent from the absorbed hydrocarbons. The fractionated light absorbent collects in the bottom of still 16 as a liquid and flows from said tower through pipe 17 and valve 18 into heat exchanger 10, etc., as described above. The absorbed hydrocarbons are fractionated from the light absorbent and pass from fractionating tower 16 as a vapor through pipes 74 and 46 into condenser coils 47, etc., as described above.

Three methods have been described for distilling and denuding the light absorbents. The methods described involve a separate stripping zone for the light absorbent in which it is only partially vaporized. Less heating and cooling equipment will be required than those in which the light absorbent is denuded in the same still with the heavy absorbent and later fractionated to recover the light absorbent. Only two absorbents have been described in the above example, but it is obvious that three or more absorbents of various molecular weights could be used in a similar manner.

The heaters 14 and 34 for the light and heavy enriched absorption oils respectively, may be steam or they may be fire stills, either shell or pipe. The heat input at the bottom of stills 16 and 36 may be by steam coils or a portion of the oil may be recirculated through a secondary coil in a furnace. It has been found that fire heated tube stills are more economical to operate than steam stills for denuding enriched absorbents.

This process may be operated at any desired pressure and temperature. However, my process makes it possible to obtain results at low pressures, which can only be obtained at high pressures, or by circulating large quantities of high molecular weight oil by the present absorption processes. The low molecular weight oil which I use in my multiple absorption system could not be used alone without excessive loss due to vaporization by the gas being processed. In order to use natural gasoline or constituents thereof as an absorbent alone, pressures as high as four hundred pounds should be used to prevent loss of same, and if butane is used alone as an absorbent, pressures as high as seven hundred or eight hundred pounds should be used. However by my process butane could be used as the first absorbent and gasoline as the second absorbent at a pressure of four hundred pounds without danger of losing absorbent. Also if gasoline is used in the first absorber and gas oil in the second absorber, the system can be operated at twenty pounds pressure or lower, without danger of losing absorbent, while if gasoline were used alone, a high operating pressure of the order of four hundred pounds would have to be used to prevent loss of absorbent.

It is obvious that by my process results can be obtained at low pressures that can be obtained only at high pressures or low temperature, or high oil rate by the present absorption processes.

Having described only a typical preferred form of my invention, I do not wish to limit myself to the specific details set forth.

What I claim is:

1. The process of extracting and recovering volatile hydrocarbons from hydrocarbon gases which consist in causing a stream of hydrocarbon gas to continuously make contact successively with a series of hydrocarbon absorbents, the molecular weights of which increase progressively throughout the series, thereby absorbing volatile hydrocarbons contained in the said gas, separately passing the enriched absorbents continuously through independent fractional distillation zones to separately denude the absorbents, cooling and returning the denuded absorbents to their respective contact zones, and finally condensing and collecting the absorbed volatile hydrocarbons.

2. The process of extracting and recovering volatile hydrocarbons from hydrocarbon gases which consist in causing a hydrocarbon gas to make contact successively with a series of two or more hydrocarbon absorbents, the molecular weights of which increase progressively throughout the series in the order in which they are contacted by said gas, thereby absorbing volatile hydrocarbons contained in the said gas, separately passing the enriched absorbents continuously into independent fractional distillation zones to separately denude the absorbents, cooling and recirculating the denuded absorbents to their respective contact zones, condensing the evolved vapors from the various distillation zones, and collecting the absorbed hydrocarbons.

3. The process of extracting and recovering volatile hydrocarbons from hydrocarbon gases and vapors which consists in causing a stream of hydrocarbon gases and vapors to successively contact in separate zones a series of absorbent mediums of a molecular weight increasing in the order in which they are contacted by said gases and vapors, continuously withdrawing said absorbent mediums and separately distilling the same to recover the volatile hydrocarbons absorbed therein, and returning said absorbent mediums to said zones containing a like absorbent medium.

4. The process of extracting and recovering volatile hydrocarbons from hydrocarbon gases which consists in causing a stream of hydrocarbon gases to continuously make successive contact in separate zones with a series of hydrocarbon absorbent mediums of a molecular weight increasing in the order in which they are contacted by said gases, absorbing in said mediums volatile hydrocarbons contained in said gases, continuously subjecting said absorbents separately to fractional distillation to separately denude said series of absorbents, cooling said denuded absorbents and recirculating the same to their respective contact zones, and condensing and collecting the volatile hydrocarbons removed from said absorbents.

5. The process of extracting and recovering volatile normally gaseous hydrocarbons from hydrocarbon gases which consists in contacting the said hydrocarbon gases with a series of liquid hydrocarbons initially free of gaseous hydrocarbons and having a molecular weight increasing in the order in which they are contacted by said gases, and separately subjecting each of the said liquid hydrocarbons comprising said series to independent fractional distillation to separately recover therefrom absorbed hydrocarbons, and separately returning each of said liquid hydrocarbons to that liquid hydrocarbon having a similar molecular weight.

6. The process of extracting and recovering volatile hydrocarbons from hydrocarbon gases which consists in causing a stream of hydrocarbon gas to continuously make contact successively with a series of hydrocarbon absorbents, the molecular weights of which increase progressively throughout the series, thereby absorbing volatile hydrocarbons contained in the said gas, separately passing the enriched absorbents continuously through independent fractional distillation zones to separately distill the absorbents, diverting a portion of the denuded absorbent from one distillation zone and introducing it to the distillation zone of the next heavier absorbent and replacing that portion of the absorbent so removed with fresh absorbent, cooling and returning the distilled absorbents to their respective contact zones, and finally condensing and collecting the absorbed volatile hydrocarbons.

HARRY E. DRENNAN.